Figure 1:
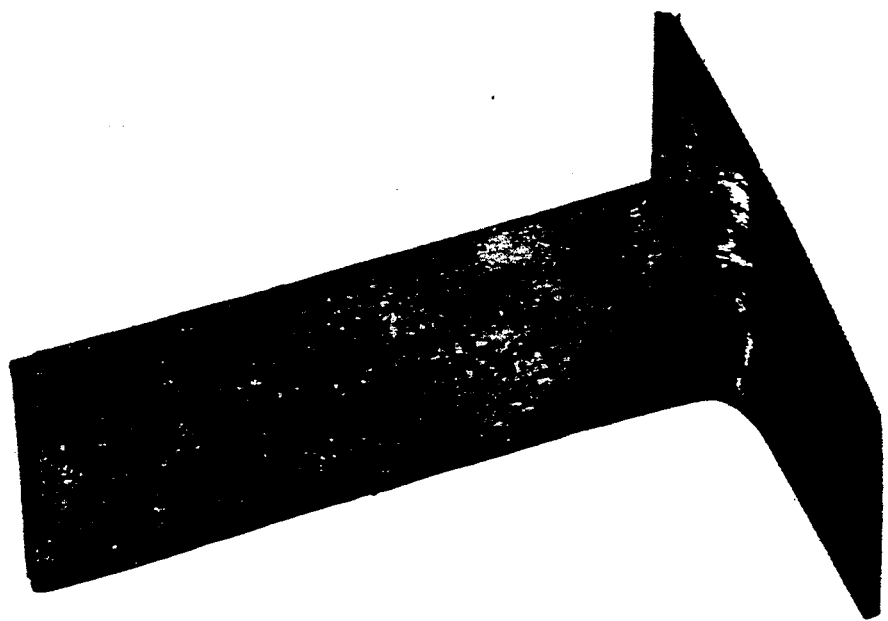

United States Patent [19]
Steel et al.

[11] Patent Number: 5,128,074
[45] Date of Patent: Jul. 7, 1992

[54] PREPARATION OF REFRACTORY MATERIALS

[75] Inventors: Margaret L. Steel, Runcorn, England; Philip Norton-Berry, Near Wrexham, Wales; Gary M. Savage, Barrow in Furness, England

[73] Assignee: Imperial Chemical Industries PLC, London, England

[21] Appl. No.: 438,304

[22] Filed: Nov. 20, 1989

[30] Foreign Application Priority Data

Nov. 21, 1988 [GB] United Kingdom ............... 8827146

[51] Int. Cl.⁵ .................... B29C 35/00; B29C 43/10
[52] U.S. Cl. .................. 264/29.1; 264/500; 264/510; 423/447.4; 423/447.8
[58] Field of Search ............ 264/570, 29.1, 29.2, 264/500, 510; 423/447.4, 447.8

[56] References Cited

U.S. PATENT DOCUMENTS

| | | |
|---|---|---|
| 3,442,857 | 5/1969 | Thornton . |
| 3,785,916 | 1/1974 | Turton . |
| 3,953,400 | 4/1976 | Dahl . |
| 3,956,240 | 5/1976 | Dahl .................. 260/47 C |
| 4,008,203 | 2/1977 | Jones ..................... 260/49 |
| 4,108,837 | 8/1978 | Johnson et al. ........... 528/126 |
| 4,524,138 | 6/1985 | Schwetz ................. 501/90 |
| 4,612,146 | 9/1986 | Huther .................. 264/29.6 |
| 4,847,021 | 7/1989 | Montgomery et al. ........ 264/570 |

FOREIGN PATENT DOCUMENTS

| | | |
|---|---|---|
| 0001879 | 3/1982 | European Pat. Off. . |
| 0056703 | 7/1982 | European Pat. Off. . |
| 0197176 | 10/1986 | European Pat. Off. . |
| 0260215 | 3/1988 | European Pat. Off. ......... 264/570 |
| 0280233 | 8/1988 | European Pat. Off. . |
| 66276 | 4/1969 | German Democratic Rep. . |
| 971227 | 9/1964 | United Kingdom . |
| 1016245 | 1/1966 | United Kingdom . |
| 1060546 | 3/1967 | United Kingdom . |
| 1078234 | 9/1967 | United Kingdom . |
| 1334702 | 10/1973 | United Kingdom . |
| 2032926 | 5/1980 | United Kingdom . |
| 1570000 | 6/1980 | United Kingdom . |

OTHER PUBLICATIONS

McAllister, Lawrence E., "Multidirectional Carbon–Carbon Composites," Handbook of Composites, 1983, vol. 4, pp. 109–175.

Savage, G., "Carbon-Carbon Composite Materials," Metals and Materials, Sep. 1988, pp. 544–548.

Fitzer, Erich, "The Future of Carbon-Carbon Composites," Carbon, vol. 25, 1987, No. 2, pp. 163–190.

Fujioka et al., "A New Process for Manufacturing Advanced Carbon-Carbon Composites Utilizing Hot Isostatic Pressing," Proc. 1st Japan International SAMPE Symposium, Nov. 28–Dec. 1, 1989, pp. 1160–1165.

*Primary Examiner*—Hubert C. Lorin
*Attorney, Agent, or Firm*—Cushman, Darby & Cushman

[57] ABSTRACT

A process for preparing a refractory material comprises subjecting a blank of a precursor composition to pyrolysis under isostatic pressure conditions in the absence of a separate hermetically sealed envelope enveloping the blank, the precursor composition comprising a thermoformable carbon precursor component.

15 Claims, 2 Drawing Sheets

PREPARATION OF REFRACTORY MATERIALS

This invention relates to the preparation of refractory materials, optionally reinforced with fibrous materials, and to the use of novel precursor compositions for such refractory materials.

The beneficial properties of refractory composites, for example carbon-carbon composites in which carbon fibers are embedded in a matrix of carbon, often present as polycrystalline graphite, has led to their use in applications requiring resistance to extreme environmental conditions. Typical applications are in aircraft brakes and space vehicle heat shields. Such composites can be prepared by vapour deposition techniques in which carbon is deposited within a fibrous structure. These techniques are extremely time-consuming and costly.

More practical processes involve the impregnation of fibrous structures with thermosetting or thermoplastic materials and pyrolysing the resultant precursor composition to create a fibre-reinforced carbon matrix. However, the pyrolysis process produces voids in the matrix of the structure. Except for applications which require porous structures, such voids necessitate a subsequent reiteration of impregnation/pyrolysis to achieve the required density for the structure, i.e. the voids are usually substantially filled with the matrix material. Clearly, these processes are also time-consuming and costly.

Another known process for the preparation of refractory composites is the formation of a precursor composition by the impregnation of fibrous structures with thermosetting materials followed by pyrolysis of the precursor composition in a high temperature isostatic moulding process (known as hot isostatic pressing or HIP). In hot isostatic pressing, the precursor composition, having been formed into a desired shape, is hermetically sealed in an impervious envelope capable of withstanding the processing temperature, e.g. up to 2000° C. or more, and the sheathed composition is subjected to heat and pressure, up to 2000 bar or more. To maintain the composition in a coherent shape and to avoid significant distortion, disruption or blistering of the composition whilst permitting the diffusion of generated volatiles therefrom, it is essential that the envelope remains intact during the HIP process. Typical envelope materials are mild steel, tantalum, tungsten and molten glass depending upon the HIP process conditions. Again, the HIP process is relatively expensive and time-consuming.

Some of these processes of preparing refractory composites, including HIP processes, from thermosetting materials and from pitches derived from coal tar and petroleum are described in Chapter III of "Handbook of Composites", Vol. 4, Ed A. Kelly and F. T. Mileiko, Elsivier 1986 and in "Carbon-Carbon Composites", G. M. Savage, Metals & Materials, September 1988.

Further known HIP processes are described in U.S. Pat. Nos. 4,612,146 and 4,524,138. U.S. Pat. No. 4,612,146 discloses an HIP process enveloping the precursor composition based on silicon compounds with amorphous carbon by coating the composition with a thermosetting material, curing the thermosetting material and carbonising the thermosetting material. U.S. Pat. No. 4,524,138 discloses an HIP process in which a pre-sintered precursor composition based on silicon and boron compounds and carbon having a sufficiently high proportion of the theoretically obtainable density for the finished structure is subjected to hot isostatic pressing without envelopment. In the latter document, if the precursor composition comprised an organic precursor, the composition had to be slowly coked under specified conditions prior to the sintering step.

The use of isostatic pressure for shaping is also known, e.g. DD-A-66276 which discloses the use of an elastomeric imprevious coating on the preformed structure for transmitting the pressure to the structure.

It is an object of the present invention to provide novel processes for the preparation of refractory materials by HIP and to use novel precursor compositions to produce refractory materials.

In accordance with one aspect of the present invention, surprisingly it has been found that good quality refractory materials can be made by hot isostatic pressing from precursor compositions comprising a carbon precursor component without envelopment of the composition.

Thus, in accordance with said one aspect of the present invention, a process for preparing a refractory material comprises subjecting a blank of a precursor composition to pyrolysis under isostatic pressure conditions in the absence of a separate hermetically sealed envelope enveloping the blank, the precursor composition comprising a thermoformable carbon precursor component.

By "thermoformable carbon precursor component" is meant a carbon precursor component which has sufficient flow during at least the initial part of the process of the invention to form an effective seal to transmit the isostatic pressure to the whole of the blank but which does not flow to an extent sufficient to result in significant distortion of the blank. The viscosities of such thermoformable carbon precursor components will generally decrease with increases in temperature. At high temperatures, however, many such materials will tend to cross-link and become intractable. Two features are thus required of the precursor if the invention is to be successful. Firstly, the precursor component will have a viscosity of not more than 100000 $Nsm^{-2}$ and preferably not more than 10000 $Nsm^{-2}$ at some temperature at which it may be adequately formed. Secondly, the minimum viscosity before the precursor component starts to cross-link or otherwise become intractable shall be not less than 1 $Nsm^{-2}$ and more preferably not less than 10 $Nsm^{-2}$. The viscosity of the thermoformable carbon precursor component may be either the inherent viscosity of a carbon precursor material, e.g. a polymeric material, or it may be the viscosity of a carbon precursor system, e.g. a carbon precursor material containing filler material such as graphite or other refractory particulate or fibrous material in a quantity sufficient to ensure the viscosity falls within the desired range. The viscosity of the thermoformable carbon precursor component can depend upon the shear rate and the shear stress conditions applied. The concern here is for resistance to low stress levels such as those caused by gravity. In this case, it is appropriate to measure the limiting viscosity of the material at low shear rate.

Preferably, the process of the invention comprises an initial step of heating the blank to a temperature at which it will flow to an extent sufficient to transfer effectively the isostatic pressure. Preferably, said temperature is at least 100° C., and more particularly at least 200° C.

The resultant pyrolysed products of the process of the invention surprisingly retain their original shapes and are substantially undistorted or blistered by the HIP process despite the fact that they are not enveloped in a hermetically sealed envelope. The degree of voiding in such products is low and the efficiency of conversion of the carbon precursor component to carbon is high. It is not clear what the precise mechanism behind the achievement of these results is but it is believed that the thermoformable carbon precursor component flows sufficiently during the initial part of the process to form an effective seal around and/or throughout the blank whereby the isostatic pressure is applied to the whole of the blank, yet enabling volatiles generated in the pyrolysis process to diffuse out of the blank without significant distortion of the blank similarly to the conventional HIP processes involving envelopment.

Although there are applications of refractory materials, e.g. medical uses, which require porous products, the majority of applications usually require products in which the maximum possible strength of the material is available. In those instances, the refractory material is desirably substantially free from porosity or at least free from voids, especially irregular voids. In such circumstances, the blank should be substantially free from such voids and, when a substantially wholly non-porous product is required, substantially free from any porosity. In the latter circumstances, the isostatic pressure is selected such that it substantially prevents any porosity developing in the blank during the process.

A wide variety of temperature and pressure conditions can be used in the process of the invention.

The process involves placing the blank in a pressure vessel in which it can be subjected to high temperatures and pressures, the latter being applied using a fluid, usually an inert gas. The temperature and pressure are applied during the process at predetermined rates until the values necessary to give a good refractory material are reached. Usually, the final temperature and pressure are maintained for a period sufficient to achieve satisfactory material. Typically, the operating temperature is at least 500° C. and is preferably in the range 750° C. to 2000° C., more particularly 750° C. to 1500° C. and more especially 900° C. to 1500° C.; and the operating pressure is at least 500 bar and is preferably in the range 750 bar to 2000 bar, more particularly 750 bar to 1500 bar and more especially 900 bar to 1500 bar.

Preferably, the blank comprises a fibrous reinforcement which preferably retains its reinforcing effect after being subjected to the HIP process. The fibrous reinforcement may be a refractory fibrous reinforcement such as carbon, boron, alumina, silicon carbide and other ceramic fibres, or it may be a fibrous material which is itself pyrolysable during the process of the invention.

The fibrous material can be in any suitable form such as continuous filaments, including unidirectional or quasi-isotropic layups and woven material; discontinuous filaments, e.g. 3 mm to 100 mm in length which may conveniently be obtained by chopping impregnated continuous filament material; short fibres, e.g. >3 mm; and fleeces, needled mats and the like.

The fibrous material can be incorporated into the blank in any convenient way such as by impregnation with a solution of or molten carbon precursor material, or with monomer or oligomer precursor material therefor, and subsequent polymerisation; or by simple blending of the materials. Impregnation techniques, particularly those using molten material, which result in good "wetting" of the fibrous material are particularly preferred as such techniques result in materials in which the physical properties are optimised. The impregnation using molten material can be achieved by introducing the material to the filaments as powder prior to melting or by film-stacking techniques. Examples of impregnation techniques are to be found in EP-A-56703, GB-A-1334702, GB-A-1570000 and U.S. Pat. No. 3,785,916.

Thus, according to another aspect of the invention, a process for preparing a refractory material comprises subjecting a blank of a precursor composition to pyrolysis under isostatic pressure conditions, the precursor composition comprising a thermoformable carbon precursor component and a fibrous component, the process including the step of forming the blank by effecting intimate contact between the components and shaping the resultant precursor composition.

In all instances, the thermoformable carbon precursor component is selected from materials which are capable of being pyrolysed to form a refractory material such as polycrystalline graphite. Such materials preferably have a high concentration of aromatic or other high-carbon-content cyclic compounds.

The thermoformable carbon precursor component is conveniently a polynuclear aromatic or other cyclic organic substance, for example hydrocarbon polymers such as polyphenylene.

Other preferred forms of polymers, which comprise novel precursors for refractory materials, are selected from aromatic polymers comprising divalent aromatic units containing divalent connecting groups selected from ketone, sulphone, sulphoxide or imide, the units being connected by ether and/or thioether linkages. Particular preferred polymers are those in which the units comprise phenylene, particularly 1,4-phenylene, groups and ketone, sulphone and/or imide groups and in which the units are connected by ether linkages. Examples of preferred polymers are:

(a) polyetherketones, particularly polyetherketones consisting essentially of 1,4-phenylene groups connected by ether and ketone linkages, more particularly those in which the ether and ketone linkages alternate, e.g. —O—Ph—CO—Ph—, or in which two ether linkages and a ketone linkage are in sequence, e.g. —O—Ph—O—Ph—CO—Ph—, or copolymers thereof;

(b) polyethersulphones, particularly polyethersulphones consisting essentially of 1,4-phenylene groups connected by ether and sulphone linkages, more particularly those in which the ether and sulphone linkages alternate, e.g. —O—Ph—SO$_2$—Ph—, or copolymers thereof with units in which two ether linkages and a sulphone linkage are in sequence, e.g. —O—Ph—O—Ph—SO$_2$—Ph—;

(c) polyetherimides, particularly polyetherimides containing phenylene, particularly 1,4-phenylene, connected by direct linkages or by ketone, sulphone or sulphoxide linkages; and (d) copolymers or blends of these polymers.

Such polymers are exemplified in EP-B-1879, U.S. Pat. Nos. 3,442,857, 3,953,400, 3,956,240, 4,008,203, 4,108,837, GB-A-971227, GB-A-1016245, GB-A-1060546, GB-A-1078234 and GB-A-2032926.

The invention includes the use of aromatic polymers comprising divalent aromatic units containing divalent connecting groups selected from ketone, sulphone, sulphoxide or imide, the units being connected by ether and/or thioether linkages, in the preparation of refractory materials. Preferably, the invention includes the use of such polymers as aforesaid in the form of fibre-reinforced composites.

The thermoformable carbon precursor component may be a curable thermoset material which falls within the aforementioned definition of the component. Impregnation is relatively simple using such materials owing to their low viscosities in the uncured state. After impregnation, such materials may be cured sufficiently to give a form-stable blank.

The thermoformable carbon precursor component may be selected from pitches based on coal tar and petroleum, which are thermoplastic, provided the viscosity of such materials is adjusted, for example by the inclusion of graphite, so that they fall within the aforementioned definition of the component.

The precursor composition may also comprise a non-thermoformable component, for example a material such as phenolic or furan resins which is not thermoformable but which is pyrolysable to a refractory material by a HIP process or inert fillers other than fibrous reinforcement when present such as graphite or other refractory particulate material.

The amount of the thermoformable carbon precursor component present should be sufficient to substantially seal the holes or pores that will tend to form during pyrolysis to an extent sufficient to form an effective seal to transmit the isostatic pressure to the whole of the block. Preferably, the thermoformable carbon precursor component is present in the precursor composition in an amount comprising at least 1%, preferably at least 5% and more particularly at least 20%, by weight of the precursor. Although the thermoformable carbon precursor component may simply form an effective coating on the remainder of the precursor composition, preferably it is intimately mixed with and dispersed throughout the remainder of the precursor composition.

When the precursor composition comprises a fibrous reinforcement, the thermoformable carbon precursor component may constitute the continuous phase of such mixtures of materials (i.e. the material which contacts the fibers) or it may constitute the discontinuous phase (i.e. the other material contacts the fibres).

The invention also includes a refractory material obtainable by subjecting a blank of a precursor composition to a single hot isostatic pressing cycle, the precursor composition comprising a thermoformable carbon precursor component, which material having a density of at least 1.30 gcm$^{-3}$, preferably at least 1.40 gcm$^{-3}$, a flexural modulus of at least 120 GPa, preferably at least 150 GPa, a flexural strength of at least 500 MPa, preferably at least 750 MPa, and a transflexural strength of at least 3 MPa, preferably at least 6 MPa.

The invention will now be illustrated with reference to the following Examples and to the accompanying FIGS. 1 to 3 which are reproductions of photographs of refractory articles made in accordance with Examples 5 to 7, respectively.

In the Examples, the samples are described as having a "good appearance". The use of the term "good appearance" is intended to denote that the sample suffered no significant distortion or shrinkage and did not suffer from surface blemishes as a result of the HIP process.

EXAMPLE 1

Refractory materials were prepared using a prepreg sheet of APC 2 material sold by Imperial Chemical Industries PLC (ICI), the APC 2 material comprising Victrex PEEK (an aromatic polyetheretherketone also made by ICI) and 68% by weight of AS 4 carbon fibres available from Hercules.

Sixteen like pieces were cut from the prepreg and stacked one on top of the other in a unidirectional array in a matched metal mould. The stack was moulded for 5 minutes at 400° C. and at a pressure of 6.8 bar. Beam specimens (150 mm×25 mm×3 mm×50 mm×10 mm×3 mm) were cut from the resultant laminate and clamped between the halves of a graphite furnace jig prior to processing, the specimens being separated into batches and subjected to hot isostatic pressing. The HIP process conditions for each batch are shown in Table I below.

In each case, the specimens were initially heated to 200° C. at a pressure of 100 bar and held at that temperature for 20 minutes before being subjected to the HIP conditions. The ramps for pressurising and heating and de-pressurising and cooling were 17 bar minute$^{-1}$, 2° C. minute$^{-1}$, 3 bar minute$^{-1}$ and 3° C. minute$^{-1}$, respectively. The specimens were held at the operating conditions for 120 minutes.

The resultant refractory materials were of good appearance.

TABLE I

| PRESSURE (BAR) | TEMPERATURE (°C.) | | | | |
| --- | --- | --- | --- | --- | --- |
| | 500 | 750 | 1000 | 1500 | 2000 |
| 500 | | | A | | |
| 750 | | | B | | |
| 1000 | F | G | C | H | I |
| 1500 | | | D | | |
| 2000 | | | E | | |

The letters denote the sample codes used in Table II below, in which table the mechanical properties of the samples are given.

TABLE II

| SAMPLE CODE | TRANSFLEXURAL STRENGTH (MPa) | FLEXURAL STRENGTH (MPa) | FLEXURAL MODULUS (GPa) | DENSITY |
| --- | --- | --- | --- | --- |
| A | 3.14 | 563 | 135 | 1.37 |
| B | 8.26 | 760 | 164 | 1.40 |
| C | 9.95 | 900 | 188 | 1.45 |
| D | 9.3 | 911 | 171 | 1.43 |
| E | 8.89 | 895 | 180 | 1.45 |
| F | 24.53 | 1250 | 125 | 1.39 |
| G | 12.72 | 1029 | 174 | 1.40 |
| H | 9.40 | 985 | 200 | 1.53 |
| I | — | — | — | — |

EXAMPLE 2

Four samples were prepared as follows:

Stage 1

A polyparaphenylene (PPP) precursor, parabenzene cis-gylcol dimethylcarboxylate, was dissolved in acetone until a solution of viscosity 5-10 poise was achieved. The solution was poured onto AS 4 carbon fiber woven cloth and the cloth was rolled to squeeze the solution into the cloth. The acetone was then allowed to evaporate off. When the acetone concentration was down to about 10%, the cloth was rolled to remove air and to partially compress the cloth. The remainder of the acetone was then allowed to evaporate off.

Stage 2

The cloths were placed into a nitrogen vented oven, heated rapidly to 200° C. and then slowly over 2-3 hours to 380°-400° C. and maintained at that temperature until it was estimated that about 80% of the monomer had polymerised. The cloths were then cooled and removed from the oven. The resultant cloths contained about 33% by weight of PPP and exhibited some shrinkage owing to condensate loss during polymerisation.

Stage 3

The impregnated cloths were then stacked and placed in a mould which was placed in a heated press and heated at 400° C. under 15 tonnes pressure. The press was cooled and the sample was removed from the mould and cut in preparation for the HIP process step.

Stage 4

The samples were subjected to the preheating and HIP process conditions described in Example 1. The final HIP process conditions were 1000° C. and 1000 bar.

The resultant refractory materials were of good appearance.

EXAMPLE 3

Twenty samples were prepared described in Example 1 using a prepreg of Ultem available from General Electric (an aromatic polyetherimide) and 68% by weight of AS 4 carbon fibers. The samples were subjected to the preheating and HIP process conditions described in Example 1. The final HIP process conditions were 1000° C. and 1000 bar.

The resultant refractory materials were of good appearance.

EXAMPLE 4

Example 3 was repeated and the resultant specimens were mechanically tested and the results are given in Table III below.

TABLE III

| TRANSFLEXURAL STRENGTH (MPa) | FLEXURAL STRENGTH (MPa) | FLEXURAL MODULUS (GPa) | DENSITY |
|---|---|---|---|
| 3.14 | 563 | 135 | 1.37 |

EXAMPLE 5

A sample of APC 2 material cut from a preconsolidated T-section stiffener was subjected to the preheating and HIP process conditions described in Example 1. The final HIP process conditions were 1000° C. and 1000 bar.

The resultant T-section refractory material was of good appearance as can be seen from FIG. 1.

EXAMPLE 6

A tubular sample of APC 2 material which was cut from a preconsolidated filament wound APC 2 tube of diameter approximately 10 mm and 0.5 mm wall thickness was subjected to the preheating and HIP process conditions described in Example 1. The final HIP process conditions were 1000° C. and 1000 bar.

Figure 2:
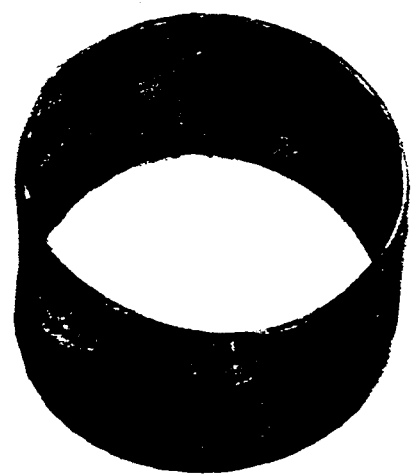

The resultant tubular refractory material was of good appearance as can be seen from FIG. 2.

EXAMPLE 7

A sample of APC 2 material cut from a preconsolidated sinusoidal-section stiffener was subjected to the preheating and HIP process conditions described in Example 1. The final HIP process conditions were 1000° C. and 1000 bar.

Figure 3:
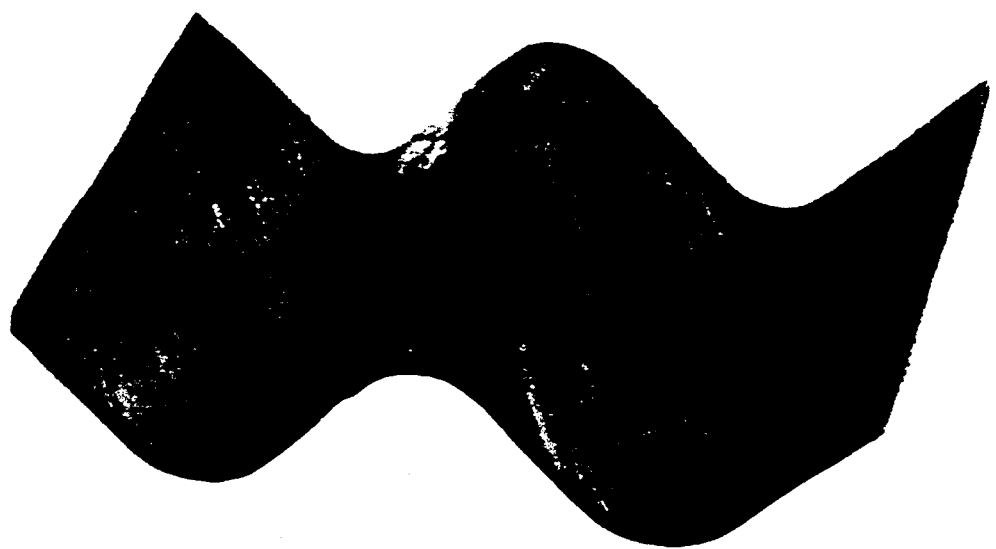

The resultant sinusoidal-section refractory material was of good appearance as can be seen from FIG. 3.

EXAMPLE 8

A sample of Aerocarb A420 pitch available from Ashland was mixed with milled pitch-based fibers having an approximate length of ... mm available from the same source in a Brabender mixer. The fibers were added until the mixture was too stiff to stir. The sample was shaped into a block and was subjected to the preheating and HIP process conditions described in Example 1. The final HIP process conditions were 1000° C. and 1000 bar.

The resultant refractory materials were of good appearance.

EXAMPLE 9

Three samples of APC 2 material were prepared as in Example 1 and were enveloped in mild steel. The samples were subjected to the HIP process conditions described in Example 1 but without the preheating step. The final HIP process conditions were 1000° C. and 1000 bar.

The resultant refractory materials were of good appearance.

We claim:

1. A process for preparing a refractory material comprising:
    (a) forming a blank of a precursor composition comprising a thermoformable carbon precursor component;
    (b) using a gas to apply isostatic pressure to said blank in the absence of a hermetically sealed envelope enveloping said blank;
    (c) initially heating said blank to a temperature insufficient to initiate pyrolysis thereof but sufficient to permit flow of said precursor composition and holding said blank at said temperature for a period which enables said flow to occur to an extent sufficient to seal said blank whereby said isostatic pressure is effectively transferred to the whole of said blank and then
    (d) heating said blank to a temperature sufficient to pyrolyze said precursor composition.

2. A process according to claim 1, wherein the thermoformable carbon precursor component has a viscosity of not more than 100000 $Nsm^{-2}$ at a temperature at which it is formable and has a viscosity of not less than 1 Nsm$^{-2}$ at the onset of intractability.

3. A process according to claim 1, wherein said temperature in step (c) is at least 100° C.

4. A process according to claim 1, wherein the pyrolysis in step (d) is carried out at an operating temperature of at least 500° C. and the isostatic pressure applied to said blank during step (d) is at least 500 bar.

5. A process according to claim 1, wherein said blank comprises a fibrous reinforcement which is not deleteriously affected by the processing conditions and which retains a reinforcement function in the resultant refractory material.

6. A process according to claim 1, wherein said thermoformable carbon precursor component has a viscosity of not more than 10,000 Nsm$^{-2}$ at a temperature at which it is formable and has a viscosity of not less than 10 Nsm$^{-2}$ at the onset of intractability.

7. A process according to claim 1, wherein the temperature in step (c) is at least 200° C.

8. A process according to claim 1, wherein the pyrolysis in step (d) is carried out at an operating temperature in the range of from 750° C. to 2000° C. and the isostatic pressure applied to said blank in step (d) is in the range of from 750 bar to 2000 bar.

9. A process according to claim 1, wherein the pyrolysis in step (d) is carried out at an operating temperature in the range of from 750° C. to 1500° C. and the isostatic pressure applied to said blank is in the range of from 750 bar to 1500 bar.

10. A process according to claim 1, wherein the pyrolysis in step (d) is carried out at an operating temperature in the range of from 1000° C. to 1500° C. and the isostatic pressure applied to said blank is in the range of from 1000 bar to 1500 bar.

11. A process according to claim 1, wherein said blank comprises a fibrous reinforcement which is not deleteriously affected by the processing conditions and which retains a reinforcement function in the resultant refractory material.

12. A process for preparing a refractory material comprising:
(a) forming a blank of a precursor composition comprising a thermoformable carbon precursor component;
(b) using a gas to apply isostatic pressure to said blank in the absence of a hermetically sealed envelope enveloping said blank;
(c) initially heating said blank under temperature a temperature of less than 500° C. and a pressure of less than 500 bar, said temperature being insufficient to initiate pyrolysis of said precursor composition but sufficient to permit flow of said precursor composition and holding said blank at said temperature for a period which enables said flow to occur to an extent sufficient to seal said blank whereby said isostatic pressure is effectively transferred to the whole of said blank; and then
(d) heating said blank to a temperature of at least 500° C. to pyrolyze said precursor composition, and an isostatic pressure of at least 500 bar.

13. A process for preparing a refractory material comprising:
(a) selecting a thermoformable carbon precursor component comprising an aromatic polymer having divalent aromatic units containing divalent connecting groups selected from ketone, sulfone, sulfoxide or imide, the units being connected by ether and/or thioether linkages;
(b) forming a blank of a precursor composition comprising said thermoformable carbon precursor component;
(c) using a gas to apply isostatic pressure to said blank in the absence of a hermetically sealed envelope enveloping said blank;
(d) initially heating said blank to a temperature insufficient to initiate pyrolysis thereof but sufficient to permit flow of said precursor composition and holding said blank at said temperature for a period which enables said flow to occur to an extent sufficient to seal said blank whereby said isostatic pressure is effectively transferred to the whole of said blank; and then
(e) heating said blank to a temperature sufficient to pyrolyze said precursor composition.

14. A process according to claim 13, in which said divalent aromatic units comprise phenylene groups and said divalent connecting groups are selected from the group consisting of ketone, sulfone and/or imide groups, said units being connected by ether linkages.

15. A process according to claim 13, wherein said thermoformable carbon precursor component comprises continuous reinforcing fibers.

* * * * *